(12) United States Patent
Lee et al.

(10) Patent No.: US 11,990,098 B2
(45) Date of Patent: May 21, 2024

(54) DISPLAY BRIGHTNESS CONTROL DEVICE

(71) Applicant: SAPIEN SEMICONDUCTORS INC., Ulsan (KR)

(72) Inventors: Jae Hoon Lee, Busan (KR); Sung Qwan Oh, Gyeonggi-do (KR)

(73) Assignee: SAPIEN SEMICONDUCTORS INC., Ulsan (KR)

( * ) Notice: Subject to any disclaimer, the term of this patent is extended or adjusted under 35 U.S.C. 154(b) by 0 days.

(21) Appl. No.: 17/918,660

(22) PCT Filed: May 24, 2021

(86) PCT No.: PCT/KR2021/006465
§ 371 (c)(1),
(2) Date: Oct. 13, 2022

(87) PCT Pub. No.: WO2021/241970
PCT Pub. Date: Dec. 2, 2021

(65) Prior Publication Data
US 2023/0144029 A1 May 11, 2023

(30) Foreign Application Priority Data
May 25, 2020 (KR) .................. 10-2020-0062424

(51) Int. Cl.
*G09G 3/3283* (2016.01)
*G06V 10/60* (2022.01)
*G09G 3/32* (2016.01)
*G09G 3/325* (2016.01)

(52) U.S. Cl.
CPC ........... *G09G 3/3283* (2013.01); *G06V 10/60* (2022.01); *G09G 3/325* (2013.01); *G09G 3/32* (2013.01); *G09G 2320/0233* (2013.01); *G09G 2320/0626* (2013.01)

(58) Field of Classification Search
CPC ........ G09G 3/3283; G09G 3/325; G09G 3/32; G09G 2320/0626; G09G 2320/0233; G06V 10/60
(Continued)

(56) References Cited

U.S. PATENT DOCUMENTS

2002/0130893 A1* 9/2002 Okuda .................. G09G 3/2081
345/691
2010/0164937 A1* 7/2010 Kim ..................... G09G 3/3225
345/212
(Continued)

FOREIGN PATENT DOCUMENTS

EP 2204792 A1 7/2010
JP 10-2007-0021360 A 2/2007
(Continued)

OTHER PUBLICATIONS

International Search Report of PCT/KR2021/006465 dated Sep. 17, 2021 [PCT/ISA/210].
(Continued)

*Primary Examiner* — Jimmy H Nguyen
(74) *Attorney, Agent, or Firm* — Pearne & Gordon LLP

(57) ABSTRACT

Provided is a device for controlling luminance of a display, having a simplified ACL circuit compared to the prior art. The device for controlling luminance of a display calculates the average luminance (Y_avg) when video data is input, and determines the luminance variation (ΔY) according to the average luminance. The device for controlling luminance of a display may adjust the luminance of a display by controlling a current (driving current) that is used to drive a light-emitting diode included in a pixel, instead of modifying video data for the adjustment of luminance. That is,
(Continued)

unlike the prior art, the device for controlling luminance of a display does not modify video data, for the control of luminance.

8 Claims, 5 Drawing Sheets

(58) Field of Classification Search
USPC .......................................... 345/77, 82, 690
See application file for complete search history.

(56) References Cited

U.S. PATENT DOCUMENTS

2013/0127923 A1* 5/2013 An ...................... G09G 3/3233
345/690
2017/0039997 A1 2/2017 An et al.

FOREIGN PATENT DOCUMENTS

| | | |
|---|---|---|
| JP | 10-2020-0041157 A | 4/2020 |
| KR | 10-2007-0050360 A | 5/2007 |
| KR | 10-2011-0099981 A | 9/2011 |
| KR | 10-2013-0055256 A | 5/2013 |
| KR | 10-2013-0065656 A | 6/2013 |
| KR | 10-2017-0098119 A | 8/2017 |
| KR | 10-1942466 B1 | 4/2019 |
| KR | 10-2019-0085324 A | 7/2019 |

OTHER PUBLICATIONS

The partial supplementary European search report issued in European Patent Application No. 21814652.0 dated Oct. 13, 2023.

* cited by examiner

DISPLAY BRIGHTNESS CONTROL DEVICE

CROSS REFERENCE TO RELATED APPLICATIONS

This application is a National Stage of International Application No. PCT/KR2021/006465, filed May 24, 2021, claiming priority to Korean Patent Application No. 10-2020-0062424, filed May 25, 2020.

TECHNICAL FIELD

The disclosure relates to a device for controlling luminance of a display, and more particularly, to device for controlling luminance of a display to which automatic current limiting (ACL) is applied.

BACKGROUND ART

With the development of electronic technology, various electronic products including displays, such as smart phones, tablet PCs, and wearable devices, have been developed and distributed. The power consumption of displays occupies a large portion of the total power consumption of electronic devices, and due to the greater demand for larger displays, larger displays are manufactured and accordingly, the power consumption therefor are increased. Since the capacity of batteries of electronic devices is limited, research and development for reducing the power consumed by displays is continuously being made.

In order to reduce the power consumption of the display, an automatic current limitation (hereinafter referred to as "ACL") technique that adjusts the luminance of displays may be used. The ACL technique is a technique based on the idea that unnecessary power consumption can be reduced by reducing luminance to the extent that the human eye cannot recognize the reduction from a bright display screen. More specifically, the average value of RGB luminance is calculated according to the on pixel rate (hereinafter, referred to as "OPR") in one frame screen displayed on a display. When the average luminance is above a certain level of luminance, luminance can be lowered using ACL within a range in which the recognition by eyes is difficult, so as to reduce unnecessary power consumption. In this case, the ratio to which the luminance is reduced, may be determined by a parameter (for example, 10%, 15%, 20%, etc.) associated with ACL.

FIG. 1 is a reference diagram for the change in luminance according to an ACL technique.

Meanwhile, there are various driving methods exist depending on the type of displays, and the methods can be largely classified as a direct driving method, a passive driving method (passive matrix), and an active driving method (active matrix). The biggest difference between the passive driving method (Passive Matrix) and the active driving method (Active Matrix) is the presence or absence of a storage capacitor or memory that stores information during one frame. Regarding the ACL technique of a display having an active driving method, there is Korean Patent Application Publication No. 10-2011-0099981 (published on Sep. 9, 2011).

FIG. 2 is a reference diagram of a conventional ACL technique of a display having an active driving method.

According to FIG. 2 and paragraphs [0033] to [0041] of the Patent Application Publication, when video data is input, the average luminance (Y_avg) is calculated. The luminance variation (ΔY) is determined according to the average luminance. Input video data is adjusted according to the determined luminance variation to generate new video data. Finally, the newly generated video data is output to the pixel circuit so that a screen with reduced luminance is output. That is, for luminance control, it is necessary to process the original video data.

According to this conventional ACL technique, video data needs to be re-generated. Thus, the circuit configuration is complicated, and the screen is delayed by the time during which video data is re-generated. In addition, as the resolution of the screen is increased, the input cycle of video data is rapidly increased. Accordingly, due to the immediate application of the regenerated video data to the pixel circuit, it is impossible to gradually adjust the luminance, which makes for the viewer to feel the discontinuous change of the screen.

DESCRIPTION OF EMBODIMENTS

Technical Problem

One or more embodiments provide a device for controlling luminance of a display, having a simplified ACL circuit compared to the prior art.

The present specification is not limited to this objective, and other objectives, which are not described above, would be clearly understood by one of ordinary skill in the art from the following description.

Solution to Problem

According to an aspect of an embodiment, a display luminance control device includes an average luminance calculation unit configured to receive an input of video data constituting one frame and calculate an average luminance, a luminance variation calculation unit configured to calculate a luminance variation by which luminance is to be reduced when the calculated average luminance is greater than or equal to a preset reference luminance, and a driving current control unit configured to change, according to the luminance variation, an amount of driving current of a pixel driving circuit that applies a driving current to a light-emitting diode.

According to an embodiment of the present specification, the average luminance calculation unit may calculate an average luminance based on an average value of on pixel rate (OPR).

According to an embodiment of the present specification, the pixel driving circuit includes a switching element connected on a pixel driving line connecting between a positive power source and a negative power source, and a light-emitting diode connected between the switching element and the positive power source or between the switching element and the negative power source. The driving current control unit may output a voltage to the switching element included in the pixel driving circuit to operate the switching element in a section in which an amount of current flowing through the pixel driving line is linearly changed according to an input voltage.

In this case, the driving current control unit includes a non-converting amplifier, a voltage amplification amount control unit configured to adjust a resistance value between a converting terminal of the non-converting amplifier and a ground according to the luminance variation, and a voltage follower configured to receive an input of the voltage output to the non-converting amplifier and output the same to the switching element included in the pixel driving circuit.

According to one embodiment of the present specification, a luminance control unit configured to output the luminance variation and a reference luminance value for calculation to the driving current control unit, may be further included.

According to an embodiment of the present specification, the luminance control unit may further output a change ratio for calculating the luminance variation to the luminance variation calculation unit.

In this regard, when a previous luminance variation calculated according to an average luminance of a previous frame and a current luminance variation calculated according to an average luminance of a current frame are equal to or greater than a preset difference, the luminance control unit is configured to calculate at least one intermediate luminance variation having a value between the previous luminance variation and the current luminance variation, and outputs the intermediate luminance variation to the luminance variation calculation unit.

A device for controlling luminance of a display according to present specification may be a component of a display device including a display panel in which a plurality of pixels are arranged in the matrix of m×n, a scan driver configured to sequentially drive pixel driving circuits included in pixels connected to each scan line among a plurality of scan lines connected to pixels arranged in a row direction among the plurality of pixels along scan lines, and a data driver for outputting video data to each pixel connected to each data line through a plurality of data lines connected to pixels arranged in a column direction among the plurality of pixels. In this regard, video data that the display luminance control device receives the input thereof is the same as video data output by the data driver to each pixel.

Other specific details of the disclosure are included in the detailed description and drawings.

Advantageous Effects of Disclosure

According to one aspect of the present specification, the configuration of the ACL circuit is simplified compared to the prior art, so that productivity can be increased and power consumption can be reduced.

According to another aspect of the present specification, luminance can be gradually adjusted, resulting in natural screen changes.

Effects of the disclosure are not limited to these effects, and other effects not described will be clearly understood by one of ordinary skill in the art from the description provided herein.

MODE OF DISCLOSURE

Figure 1:
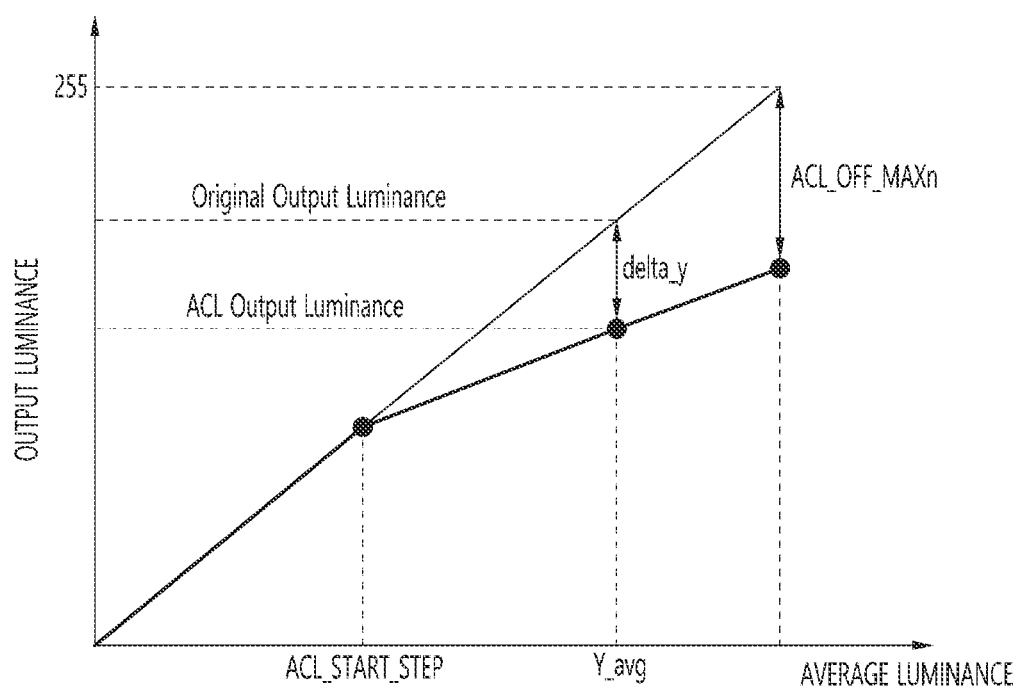
FIG. 1 is a reference diagram for the change in luminance according to an ACL technique.

Advantages and features of the disclosure disclosed herein, and a method of achieving the same, will become apparent with reference to the embodiments described below in detail in conjunction with the accompanying drawings. However, the present specification is not limited to the embodiments described below, and may be implemented in various different forms. The present embodiments are provided to make the disclosure of the present specification to be complete, and to fully inform, of the scope of the present specification, one of ordinary skill in the art to which this specification belongs. The scope of the present specification is defined only by the scope of the claims.

The terminology used herein is provided for the purpose of describing the embodiments and is not intended to limit the scope of the present specification. In this specification, the singular form also includes the plural form unless specifically stated otherwise herein. The terms "comprises" and/or "comprising" do not exclude the presence or addition of one or more other components in addition to the stated components.

Like reference numerals refer to like elements throughout the specification, and "and/or" includes each and every combination of one or more of the listed elements. Although "first" and "second", etc. are used to describe various elements, these elements are not limited by these terms. These terms are only used to distinguish one component from another component. Accordingly, within the technical spirit of the present disclosure, it can be understood that a first component described below may be a second component.

Unless otherwise defined, all terms (including technical and scientific terms) used in this specification may be used as having meanings commonly understood by one of ordinary skill in the art to which this specification belongs. In addition, terms defined in a commonly used dictionary are not to be interpreted ideally or excessively unless explicitly specifically defined herein. Hereinafter, embodiments of the disclosure will be described in detail with reference to the accompanying drawings.

Figure 3:
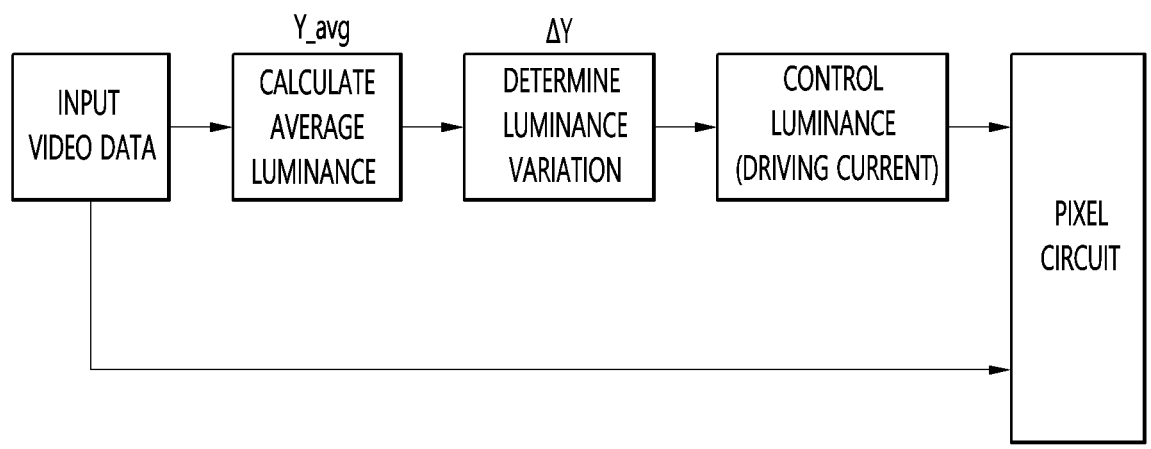
FIG. 3 is a reference diagram for the operation of a device for controlling luminance of a display according to the present specification.

FIG. 3 is a reference diagram for the operation of a device for controlling luminance of a display according to the present specification.

Figure 2:
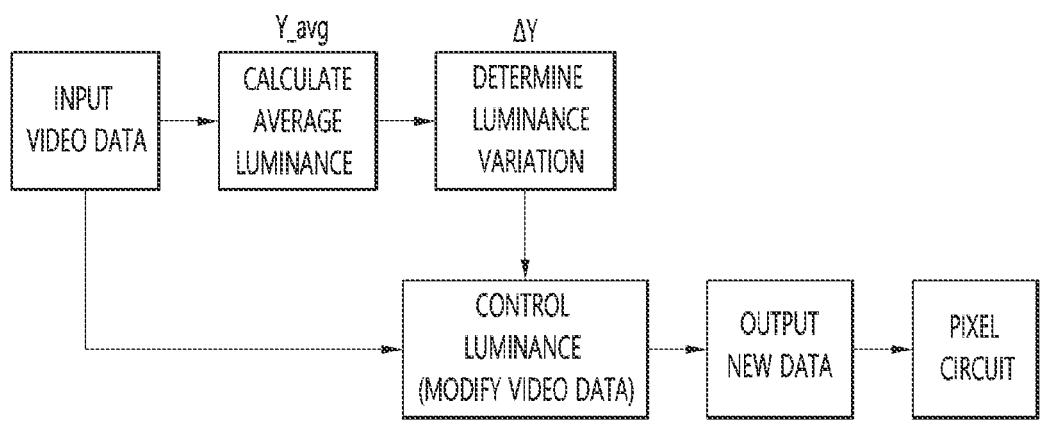
FIG. 2 is a reference diagram of a conventional ACL technique of a display having an active driving method.

FIG. 3 and FIG. 2 are common in that when video data is input, the average luminance (Y_avg) is calculated, and the process of determining the luminance variation (ΔY) according to the average luminance. However, unlike the prior art, according to the present specification, the device for controlling luminance of a display may adjust the luminance of a display by controlling a current (driving current) that is used to drive a light-emitting diode included in a pixel, instead of modifying video data for the adjustment of luminance. That is, unlike the prior art, the device for controlling luminance of a display according to the present specification does not modify video data, for the control of luminance.

Figure 4:
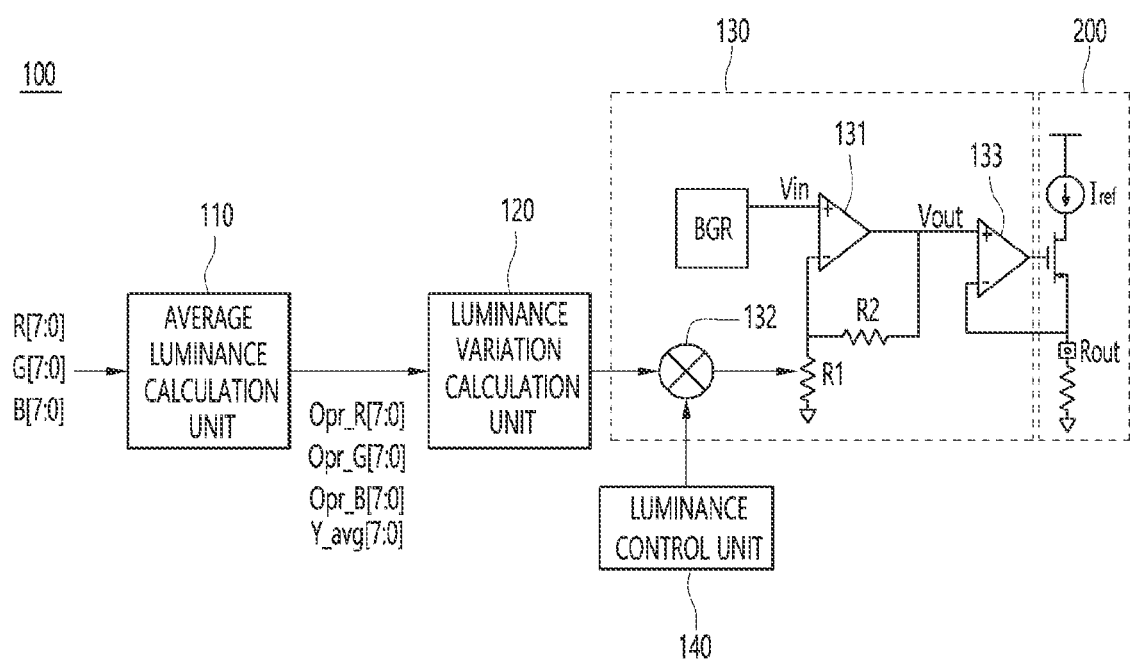
FIG. 4 is a block diagram schematically showing the configuration of a device for controlling luminance of a display according to the present specification.

FIG. 4 is a block diagram schematically showing the configuration of a device for controlling luminance of a display according to the present specification.

Referring to FIG. 4, a display luminance control device 100 according to the present specification may include an average luminance calculation unit 110, a luminance variation calculation unit 120, and a driving current control unit 130.

The average luminance calculation unit 110 may calculate an average luminance by receiving the input of video data constituting one frame. According to an embodiment of the present specification, the average luminance calculation unit 110 may calculate an average luminance (Y_avg) based on an average value of on pixel rate (OPR). Although in the embodiment shown in FIG. 4, each of RGB data is 8 bits, the present specification is not limited thereto.

The luminance variation calculation unit 120 may calculate a luminance variation (ΔY) by which luminance is to be reduced when the calculated average luminance is equal to or greater than a preset reference luminance. The process of calculating the luminance variation (ΔY) in relation to ACL is a technique that is well-known to one of ordinary skill in the art. Accordingly, detailed descriptions therefor will be omitted. In one or more embodiments, the reference luminance amount may vary.

The driving current control unit 130 may change, according to the luminance variation, the amount of driving current of a pixel driving circuit 200, which applies a driving current to a light-emitting diode. In general, in a pixel driving circuit 200, a switching element (for example, a transistor) is connected on a pixel driving line connecting between a positive power source (+) and a negative power source (−, GND). A light-emitting diode (LED) is connected between the switching element and the positive power source or between the switching element and the negative power source. Accordingly, when the switching element is turned on, a driving current may be applied to the light-emitting diode to turn on the light-emitting diode. In the case of a switching element included in the pixel driving circuit 200, for example, a field-effect transistor (FET), there are a section in which the amount of current flowing between a drain terminal and a source terminal changes linearly and a saturation section in which a constant amount of current flows regardless of the magnitude of the voltage, according to the magnitude of a voltage applied to the gate terminal. The driving current control unit 130 may output a voltage to the switching element so that the switching element operates in the linear section.

According to an embodiment of the present specification, the driving current control unit 130 may include a non-converting amplifier 131, a voltage amplification amount adjusting unit 132 that adjusts a resistance value R1 between the converting terminal (−) of the non-converting amplifier 131 and the ground, and a voltage follower 133 which receives the input of the voltage from the non-converting amplifier 131 and outputs the same to a switching element included in the pixel driving circuit. For reference, "BGR" shown in FIG. 4 refers to a band gap reference, and inputs a constant voltage to the non-converting terminal (+) of the non-converting amplifier 131.

Meanwhile, the display luminance control device 100 according to the present specification may further include a luminance control unit 140.

The luminance control unit 140 may output the luminance variation and a reference luminance value for calculation to the driving current control unit 130, for example, the voltage amplification amount adjusting unit 132. The reference luminance value refers to luminance output on the screen when ACL is not applied.

The luminance control unit 140 may output a change ratio for calculating the luminance variation to the luminance variation calculation unit 120. The change ratio refers to the degree of decrease from the reference luminance, and may be set variously, such as 1%, 3%, 5%, 10%, 15%, and may be changed during the operation of a display.

The luminance control unit 140 outputs a value related to the change ratio to the luminance variation calculation unit 120 so that the luminance variation calculation unit 120 calculates a luminance variation according to the changed change ratio.

On the other hand, the display luminance control device 100 according to the present specification reduces the luminance in consideration of the average luminance of the frame. When the difference between the luminance of the previous frame and the luminance of the current frame is large, a rapid luminance change may occur. In this case, to the viewer, the continuity of the screen due to the change in luminance is rather poor. Accordingly, there is a need to address this issue.

To this end, when a previous luminance variation calculated according to the average luminance of the previous frame and a current luminance variation calculated according to the average luminance of the current frame are equal to or greater than a preset difference, the luminance control unit 140 may be configured to calculate at least one intermediate luminance variation having a value between the previous luminance variation and the current luminance variation, and may output the intermediate luminance variation to the luminance variation calculation unit 120.

Figure 5:
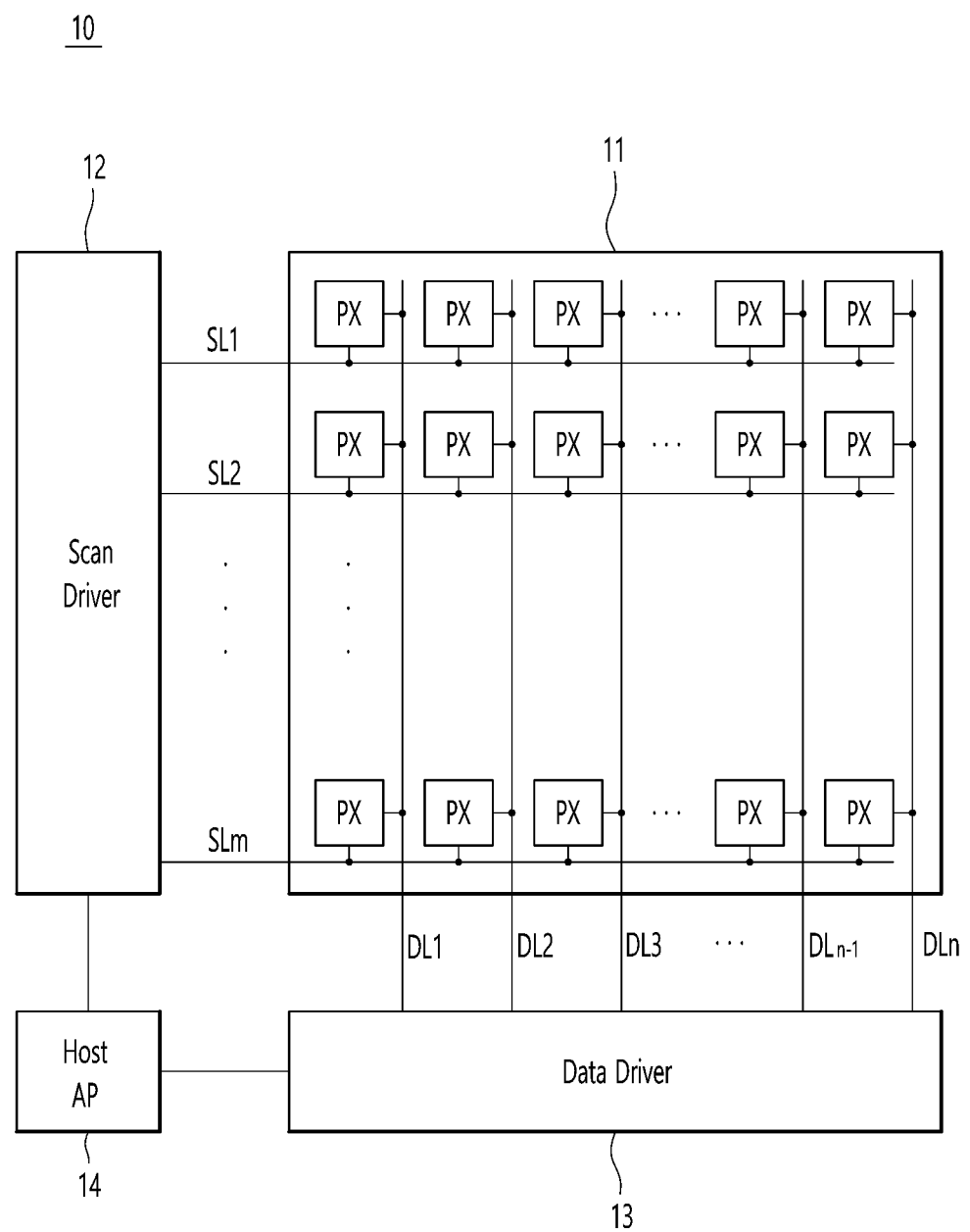
FIG. 5 is a block diagram schematically illustrating the configuration of a display device.

FIG. 5 is a block diagram schematically illustrating the configuration of a display device.

Referring to FIG. 5, a display device 10 may include a display panel 11, a scan driver 12, a data driver 13, and a processor 14.

The display panel 11 may include a plurality of pixels PX. The plurality of pixels PX may be arranged in the matrix of m×n (m and n are each a natural number). However, the pattern in which the plurality of pixels are arranged may vary according to embodiments. For example, the pattern may be of a zigzag type.

The display panel 11 may be implemented as one of a liquid crystal display (LCD), a light emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), and a vacuum fluorescent display (VFD), and may also be implemented as other types of flat panel display or flexible display. In the present specification, the LED display panel will be described as an example.

Each pixel PX may include a plurality of light-emitting devices. The light-emitting devices may each be a light-emitting diode (LED). Each of the light-emitting diodes may be a micro LED having a size of 80 μm or less. One pixel PX may output various colors through a plurality of light-emitting devices having different colors. For example, one pixel PX may include a red light-emitting device, a green light-emitting device, and a blue light-emitting device. In an embodiment, a white light-emitting device may be further included, and the white light-emitting device may replace any one of the red light-emitting device, the green light-emitting device, and the blue light-emitting device. Each light-emitting device included in one pixel PX is called a "sub pixel".

Each pixel PX may include a pixel driving circuit for driving a plurality of sub-pixels. The pixel driving circuit may drive a turn-on or turn-off operation of a sub-pixel according to a control signal output from the scan driver 12 and/or the data driver 13. The pixel driving circuit may include at least one thin film transistor and at least one capacitor. The pixel driving circuit may be implemented as a stacked structure on a semiconductor wafer.

The display panel 11 may include scan lines $SL_1$ to $SL_m$ arranged in a row direction and data lines $DL_1$ to $DL_n$ arranged in a column direction. Pixels PX may be located at intersections of the scan lines $SL_1$ to $SL_m$ and the data lines $DL_1$ to $DL_n$. Each pixel PX may be connected to any one scan line $SL_k$ and any one data line $DL_k$. The scan lines $SL_1$ to $SL_m$ may be connected to the scan driver 12, and the data lines $DL_1$ to $DL_n$ may be connected to the data driver 13.

The scan driver 12 may allow pixels connected to any one of the scan lines $SL_1$ to $SL_m$ to be driven. In an embodiment, the scan driver 12 may sequentially select the scan lines $SL_1$ to $SL_m$. For example, during a first scan driving period, pixels connected to the first scan line $SL_1$ may be driven, and during a second scan driving period, pixels connected to the second scan line $SL_2$ may be driven.

The data driver 13 may output a gradation voltage to each pixel through the data lines $DL_1$ to $DL_n$. Although one data line is connected to a plurality of pixels in the column direction, only pixels connected to the scan line selected by the scan driver 12 may be driven during a certain scan driving period. Accordingly, the data driver 13 may output a gradation voltage to pixels corresponding to one scan line through the data lines $DL_1$ to $DL_n$ during the scan driving period. Meanwhile, in the case of a display (memory in pixel) (MIP) in which instead of a capacitor, a memory cell is embedded in a pixel, data related to the gradation may be input instead of the gradation voltage.

The processor 14 may output a control signal to execute the operations of the scan driver 12 and the data driver 13. The processor 14 may output a control signal corresponding to image data corresponding to one image frame to each of the scan driver 12 and the data driver 13.

The display luminance control device 100 according to the present specification may be a component of the processor 14. In this case, the video data that the display luminance control device 100 receives the input thereof, may be the same as the video data output by the data driver 13 to each pixel. In other words, since the display luminance control device 100 according to the present specification does not modify the original video data, the circuit configuration may be simplified compared to the prior art, and the processing speed may be improved due to the simple circuit configuration.

To executing calculations and various control logic, the display luminance control device 100 according to the present specification including the processor 14, may include a microprocessor, an application-specific integrated circuit (ASIC), other chipsets, a logic circuit, registers, communication modems, data processing devices, and the like, which are known in the art to which the disclosure pertains. In addition, when the control logic is implemented in software, the processor 14 and the like may be implemented as a set of program modules. In this regard, the program modules may be stored in the memory and executed by the processor.

The computer program may include a code coded in a computer language such as C/C++, C#, JAVA, Python, machine language, or the like, which can be read by a processor (CPU) of a computer through a device interface of the computer, in order for the computer to read the program and execute the methods implemented as a program. Such code may include functional codes related to a function defining functions necessary for executing the methods, etc., and may include a control code related to an execution procedure necessary for the processor of the computer to execute the functions according to a predetermined procedure. In addition, the code may further include additional information necessary for the processor of the computer to execute the functions, or a code related to memory reference regarding a location (address address) in the internal or external memory of the computer at which the media needs to be referred to. In addition, when the processor of the computer needs to communicate with any other computer or server located remotely in order to execute the functions, the code may further include a communication-related code regarding how to communicate with any other computer or server remotely by using the communication module of the computer and regarding what information or media to transmit and receive during communication.

The storage medium is not a medium that stores data for a short moment, such as a register, a cache, a memory, etc., but a medium that stores data semi-permanently and can be read by a device. Specifically, examples of the storage medium include, but are not limited to, a read only memory (ROM), a random access memory (RAM), a CD-ROM, a magnetic tape, a floppy disk, an optical data storage device, and the like. That is, the program may be stored in various recording media on various servers accessible by the computer or in various recording media on the computer of the user. In addition, the medium may store a code that is distributed in a computer system connected by a network and can be read by a computer in a distributed manner.

Hereinbefore, the embodiments of the present specification have been described with reference to the accompanying drawings. However, one of ordinary skill in the art to which the present specification belongs would understand that the disclosure can be implemented in other specific forms without changing its technical idea or essential features. Therefore, it should be understood that the embodiments described above are illustrative in all respects and not restrictive.

EXPLANATION OF REFERENCE NUMERALS DESIGNATING THE MAJOR ELEMENTS OF THE DRAWINGS

100: Display luminance control device
110: Average luminance calculation unit
120: Luminance variation calculation unit
130: Driving current control unit
140: Luminance control unit

What is claimed is:

1. A display luminance control device for controlling luminance of a display device with a pixel circuit comprising a switching transistor for operating a light-emitting diode (LED), the display luminance control device comprising:
   a processor configured to:
      calculate an average-luminance value from an inputted video data;
      calculate a luminance-variation value by which the luminance is to be reduced when the calculated average-luminance value is greater than a preset reference-luminance value; and
   a current control circuit configured to control a driving current of the pixel circuit according to the luminance-variation value, wherein the current control circuit comprises:
      a first amplifier configured to produce an output voltage, and
      an adjustable resistor configured to control an amount of a voltage-amplification value of the first amplifier based on the luminance-variation value, and
   wherein the switching transistor connected to a pixel driving line through which an amount of current flowing through the pixel driving line for driving the LED is linearly changed based on the output voltage.

2. The display luminance control device of claim 1, wherein the processor is further configured to calculate the average-luminance value based on an average value of on-pixel rate (OPR).

3. The display device comprising the display luminance control device of claim 1, wherein the pixel circuit includes:
the pixel driving line connected between a positive power source and a negative power source.

4. The display device of claim 3, wherein
the first amplifier is a non-converting amplifier, and
the adjustable resistor is disposed between a converting terminal of the non-converting amplifier and a ground, and
wherein the current control circuit further comprises:
a voltage follower amplifier configured to output the output voltage to the switching transistor by receiving the output voltage of the non-converting amplifier.

5. The display luminance control device of claim 1, wherein the processor is further configured to generate a reference-luminance value used for a calculation with the luminance-variation value.

6. The display luminance control device of claim 5, wherein the processor is configured to generate a change ratio from the reference-luminance value for calculating the luminance-variation value.

7. The display luminance control device of claim 6, wherein when a difference between a first luminance-variation value of a video data in a previous frame and a second luminance-variation value of a video data in a current frame is more than a preset value, the processor is further configured to calculate at least one intermediate luminance-variation value that is any one of between the first luminance-variation value and the second luminance-variation value, and generate the intermediate luminance-variation value.

8. The display device comprising:
the display luminance control device of claim 1;
a display panel in which a plurality of pixels are arranged in the matrix of m×n;
a scan driver configured to sequentially drive pixel circuits included in pixels connected to each scan line among a plurality of scan lines connected to pixels arranged in a row direction among the plurality of pixels, along scan lines; and
a data driver configured to output video data to each pixel connected to each data line through a plurality of data lines connected to pixels arranged in a column direction among the plurality of pixels,
wherein video data that the display luminance control device receives the input thereof is the same as video data output by the data driver to each pixel.

* * * * *